Nov. 17, 1925.   J. C. CHLADEK   1,562,206
DUAL ROTARY SNOWPLOW
Filed Aug. 4, 1924   2 Sheets-Sheet 1
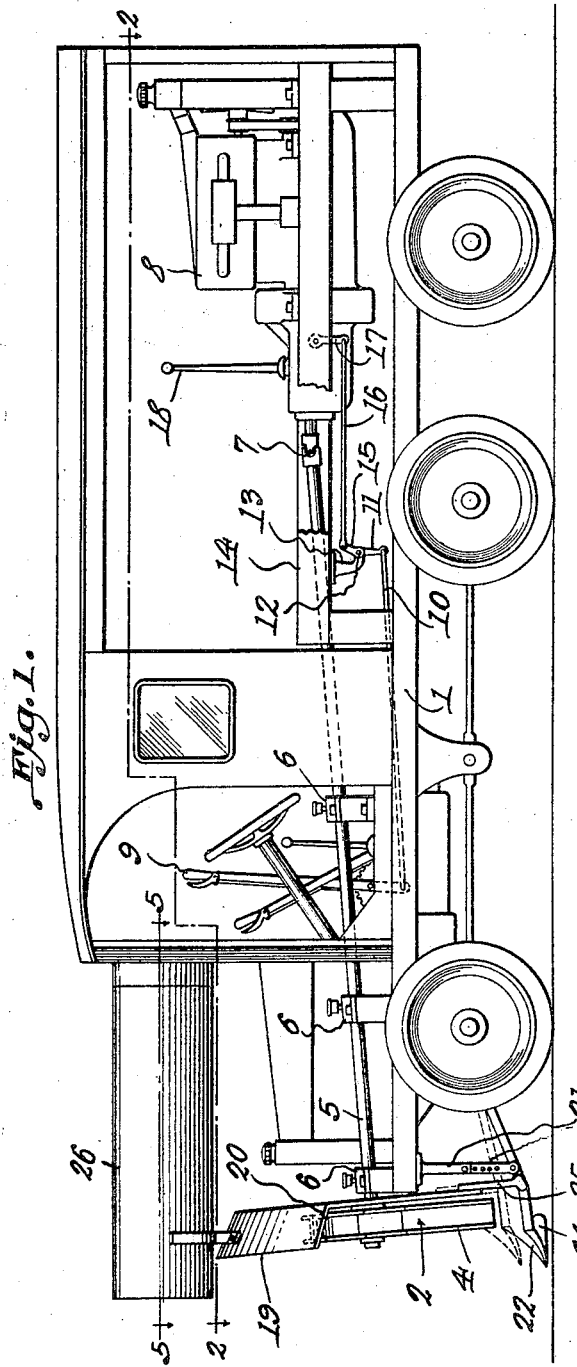
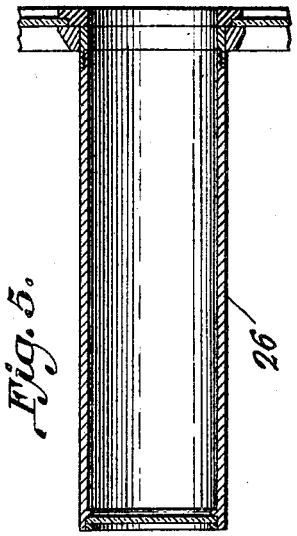
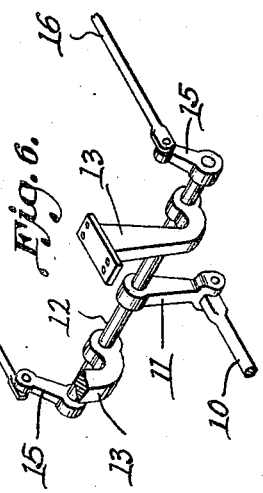
Inventor
Joseph C. Chladek
By Lester L. Sargent
Attorney

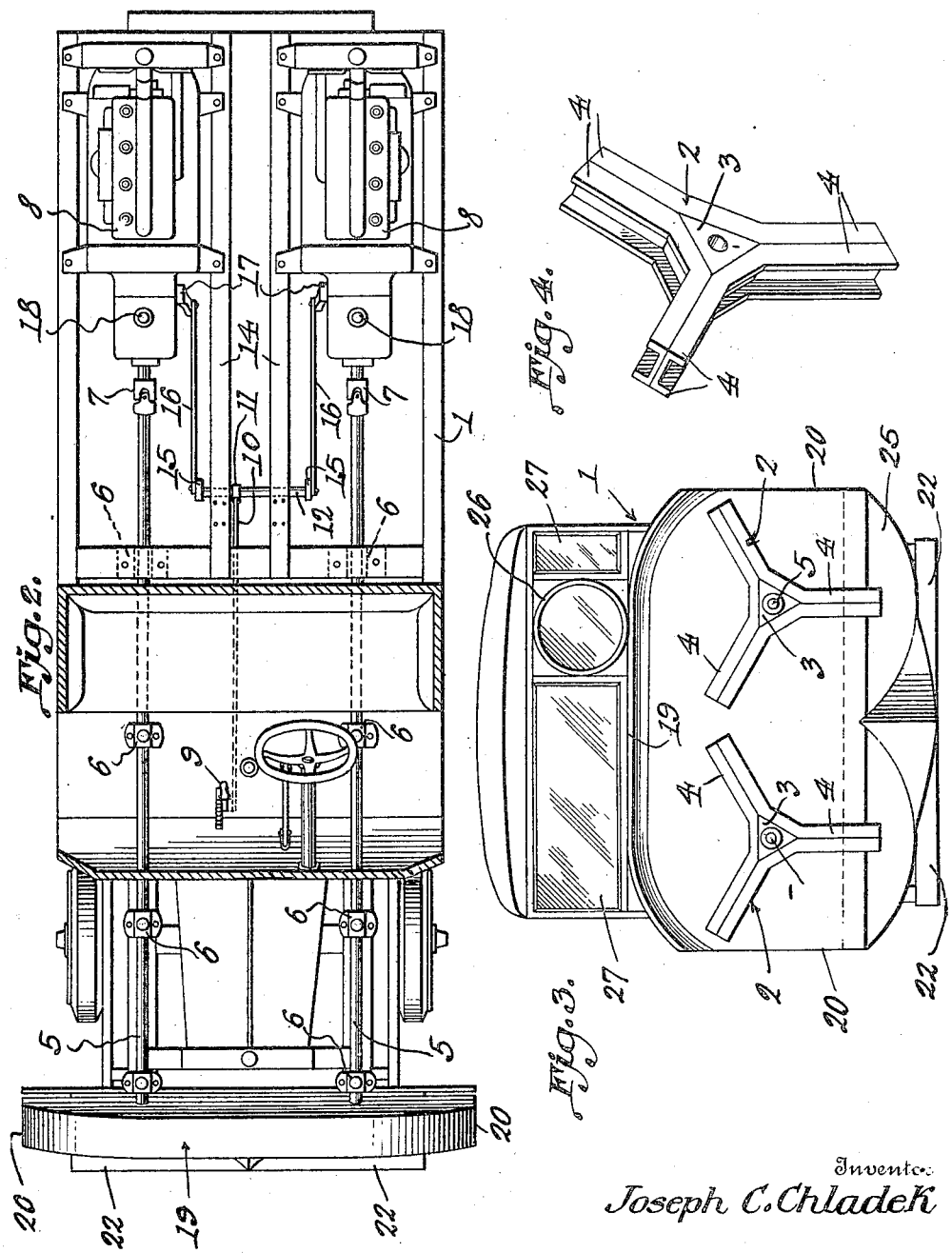

Patented Nov. 17, 1925.

1,562,206

UNITED STATES PATENT OFFICE.

JOSEPH C. CHLADEK, OF MOUNT HOREB, WISCONSIN, ASSIGNOR OF ONE-FOURTH TO ROY A. BEAT AND ONE-FOURTH TO JOHN BEAT, BOTH OF MOUNT HOREB, WISCONSIN.

DUAL ROTARY SNOWPLOW.

Application filed August 4, 1924. Serial No. 730,116.

*To all whom it may concern:*

Be it known that I, JOSEPH C. CHLADEK, a citizen of the United States, and resident of Mount Horeb, in the county of Dane and State of Wisconsin, have invented a Dual Rotary Snowplow, of which the following is a specification.

The object of my invention is to provide a snow plow having a plurality of fans to discharge the snow; to provide a type of snow plow adapted to be connected with or used on motor trucks with an independent power system; to provide means for independently operating the plows whereby they may be operated in either direction to discharge snow at either side or both sides; and to provide various details of construction and arrangement of a snow plow of this class. I attain these and other objects of my invention by the mechanism illustrated in the accompanying drawings, in which—

Figure 1 is a side elevation of my invention, applied to a motor truck;

Fig. 2 is a horizontal section on line 2—2 of Fig. 1;

Fig. 3 is a front elevation;

Fig. 4 is a detail perspective view of one of the plows or fans;

Fig. 5 is a horizontal section on line 5—5 of Fig. 1; and

Fig. 6 is a detail perspective view of a portion of the controlling mechanism.

Like numerals indicate like parts in each of the several views.

Referring to the accompanying drawings, there is shown a conventional truck 1 on which are mounted shafts 5 carrying the rotary plows 2. Plows 2 comprise a triangular hub 3 and the channel-iron plow arms 4, as illustrated. I provide suitable bearings 6 on which the shafts 5 are rotatably mounted. I provide universal joint 7 whereby the shafts 5 are connected with the transmission shafts of the engine or motors 8, the speed being controlled by the levers 18 and operation being governed by the clutch levers 17, which are connected by rods 16 with links 15 which are fixed to the rock shaft 12. Rock shaft 12 is rotatably mounted in suitable bearings 13. A lever 11 is fixed to rock shaft 12 and operatively connected to the rod 10 which is controlled by a suitable operating lever 9 by which the clutches 17 may be thrown into and out of engagement.

I provide a suitable plow casing 19, having open sides 20 for the discharge of snow. I provide an adjustable support 21 on which a cutting share is mounted, this cutting share 22 being provided with a suitable shoe 24, as shown in Fig. 1. I also provide a suitable lower fan casing 25 as shown in Fig. 3 which is vertically adjustable by means of adjustable support 21.

Referring to Figs. 1, 3 and 5, I provide a suitable periscope 26 extending preferably in a plane sufficiently beyond the upper plow casing to afford clear vision ahead past the snow thrown out by the plows. I also provide suitable windows or windshield 27, as shown in Fig. 3.

The engines operate independently of each other and each one is equipped with a transmission thereby making it possible to rotate the plows in either direction and at various speeds. With this arrangement I am able to discharge the snow at either side through the openings 20 or at both sides if desired, by simply changing the direction of rotation of a plow.

The plow arms being of channel iron of approximately I-shape in cross section makes possible effective cutting through a crust of ice on the surface of snow drifts and also functions to prevent caking of snow on the fan casings.

The device may be applied to any motor driven truck with either independent or dependent power plant, preferably the former, and provides an effective and inexpensive method of removing snow from highways in the manner described and illustrated.

What I claim is:

1. In a dual rotary snow plow, the combination of an upper plow casing, a lower plow casing, the casings having lateral passages between each other for the discharge of snow at either side, rotary snow plows positioned for operation within said casings, and means for driving the aforesaid rotary snow plows independently in either direction to discharge snow from either side or from both sides through the lateral discharge passages.

2. In a dual rotary snow plow, the combination of an upper plow casing, a lower plow casing, the casings having lateral passages between each other for the discharge of snow at either side, the lower casing being vertically adjustable relative to the upper casing, rotary snow plows positioned for operation within said casings, and means for driving the aforesaid rotary snow plows independently in either direction to discharge snow from either side or from both sides through the lateral discharge passages.

3. In combination with the apparatus described in claim 1, adjustable means for supporting the lower snow plow casing in a vertically adjusted position, a snow plow share carried by the aforesaid means, and a shoe provided on said snow plow share.

4. In a dual rotary snow plow, the combination of upper and lower plow casings, the lower plow casing being vertically adjustable, a plow share vertically adjustable with the lower plow casing, one or more rotary plows, said plows having blades formed of channel iron and being of approximately I-shape in cross section to effectively cut through crusts of ice on the surface of snowdrifts and to prevent caking of the snow on the plow casing.

JOSEPH C. CHLADEK.